US012397304B2

(12) United States Patent
Franson et al.

(10) Patent No.: US 12,397,304 B2
(45) **Date of Patent: *Aug. 26, 2025**

(54) DRY FIRE PROTECTION SPRINKLER AND FLUID DEFLECTION MEMBER ASSEMBLIES

(71) Applicant: Minimax Viking Patent Management GmbH, Bad Oldesloe (DE)

(72) Inventors: Scott T. Franson, Hastings, MI (US); Darci Ann Flowers, Hastings, MI (US)

(73) Assignee: Minimax Viking Patent Management GmbH, Bad Oldesloe (DE)

( * ) Notice: Subject to any disclaimer, the term of this patent is extended or adjusted under 35 U.S.C. 154(b) by 383 days.

This patent is subject to a terminal disclaimer.

(21) Appl. No.: 17/912,927

(22) PCT Filed: Mar. 30, 2021

(86) PCT No.: PCT/US2021/024905

§ 371 (c)(1),
(2) Date: Sep. 20, 2022

(87) PCT Pub. No.: WO2021/202543

PCT Pub. Date: Oct. 7, 2021

(65) Prior Publication Data

US 2023/0149953 A1 May 18, 2023

Related U.S. Application Data

(60) Provisional application No. 63/003,660, filed on Apr. 1, 2020.

(51) Int. Cl.
*B05B 1/26* (2006.01)
*A62C 37/14* (2006.01)

(52) U.S. Cl.
CPC .............. *B05B 1/267* (2013.01); *A62C 37/14* (2013.01)

(58) Field of Classification Search
CPC ......... A62C 35/62; A62C 37/11; A62C 37/12; A62C 37/14; A62C 37/16; B05B 1/262; B05B 1/267
See application file for complete search history.

(56) References Cited

U.S. PATENT DOCUMENTS

| | | | | |
|---|---|---|---|---|
| 5,664,630 A | 9/1997 | Meyer et al. | | |
| 7,516,800 B1 * | 4/2009 | Silva, Jr. ................ | A62C 35/62 169/17 | |

(Continued)

FOREIGN PATENT DOCUMENTS

| | | |
|---|---|---|
| WO | WO 2021/077060 | 4/2021 |
| WO | WO 2021/202525 | 10/2021 |
| WO | WO 2021/202529 | 10/2021 |

OTHER PUBLICATIONS

International Searching Authority, International Search Report and Written Opinion in International Appln. No. PCT/US2021/024905, Jun. 29, 2021, 12 pp.

(Continued)

*Primary Examiner* — Darren W Gorman
(74) *Attorney, Agent, or Firm* — Perkins Coie LLP

(57) ABSTRACT

A dry fire protection sprinkler assembly. The sprinkler assembly includes an elongate tubular outer housing having a first end and a second end opposite the first end. The second end of the housing defines a fluid discharge end of the sprinkler assembly having an outlet opening. A fluid deflection member is affixed to the housing at a preferably fixed distance from the outlet opening. The sprinkler assembly and the fluid deflection member define an unencumbered fluid flow path for a column of fluid discharge from the outlet opening. The fluid deflection member includes at least one tab to act on the unencumbered column of fluid discharge.

28 Claims, 7 Drawing Sheets

(56) References Cited

U.S. PATENT DOCUMENTS

| | | | | |
|---|---|---|---|---|
| 7,559,376 | B2 * | 7/2009 | Silva, Jr. ................ | A62C 37/11<br>169/17 |
| 7,712,218 | B2 | 5/2010 | Franson et al. | |
| 7,766,252 | B2 | 8/2010 | Jackson et al. | |
| 7,921,928 | B2 | 4/2011 | Thompson et al. | |
| 8,151,462 | B2 | 4/2012 | Franson et al. | |
| 8,636,075 | B2 | 1/2014 | Franson et al. | |
| 8,662,190 | B2 | 3/2014 | Watson | |
| 8,789,615 | B2 * | 7/2014 | Franson .................. | B05B 1/267<br>169/41 |
| 10,238,903 | B2 | 3/2019 | Pipe | |
| 10,953,252 | B2 * | 3/2021 | Ringer ................... | A62C 35/68 |
| 2005/0173562 | A1 | 8/2005 | Franson et al. | |
| 2006/0219817 | A1 | 10/2006 | Franson et al. | |
| 2012/0186832 | A1 * | 7/2012 | Orr ........................ | A62C 35/00<br>169/37 |
| 2013/0105605 | A1 | 5/2013 | Watson | |
| 2015/0122513 | A1 * | 5/2015 | Miller .................... | A62C 35/62<br>169/37 |
| 2020/0061401 | A1 * | 2/2020 | Pechacek ............... | A62C 3/004 |

OTHER PUBLICATIONS

Reliable Automatic Sprinkler Co., Inc., Datasheet, Model F3 Res 44 Dry (SIN RA5231) K4.4 (63 metric) Residential Dry Horizontal Sidewall Sprinkler, Bulletin 052 Nov. 2019, 9 pages.

Tyco Fire Products LP, Datasheet, Rapid Response Series LFII Residential Sprinkler 4.4 K-factor Horizontal Sidewall, Dry Type Wet Pipe System, TFP 461, Dec. 2018, 6 pages.

* cited by examiner

DRY FIRE PROTECTION SPRINKLER AND FLUID DEFLECTION MEMBER ASSEMBLIES

PRIORITY DATA AND INCORPORATION BY REFERENCE

This application is a 35 U.S.C. § 371 application of International Application No. PCT/US2021/024905, filed Mar. 30, 2021, which claims the benefit of U.S. Provisional Application No. 63/003,660 filed Apr. 1, 2020, each of which is incorporated by reference in its entirety.

TECHNICAL FIELD

The present invention relates generally to dry sprinkler assemblies and in particular, dry fire protection sprinkler and fluid deflection member assemblies.

BACKGROUND ART

Generally, automatic fire protection sprinklers include a sprinkler frame and/or housing having an inlet, an outlet and internal passageway through which firefighting fluid flows and discharged to impact a fluid deflection member that is coupled to the sprinkler frame and spaced from the outlet. Fluid flow through the sprinkler is controlled by a thermally responsive trigger which supports a sealing assembly in a position that seals the internal passageway of the sprinkler. The trigger has a nominal operating temperature and thermal sensitivity to define the thermal responsiveness of the sprinkler at which the sprinkler actuates in response to a fire. Upon thermal actuation of the trigger in response to a fire, the trigger fractures or collapses thereby releasing the sealing assembly to allow the flow of fluid through the sprinkler internal passageway, out the outlet and toward the fluid deflection member. Fluid deflection members can be formed to a variety of geometries to suit a given fire protection application. The deflector geometries can be categorized into one of two types. One type of fluid deflection member presents a central abutment to the fluid discharge from the outlet opening and fans the fluid discharge radially. Such a deflector geometry is shown, for example, in U.S. Pat. Nos. 7,766,252 and 5,664,630.

An alternate type of deflection geometry defines an unencumbered fluid flow path. As used herein, an "unencumbered fluid flow path" provides for a fluid discharge column in which its central core is not impacted by any sprinkler structure and fanned radially. Instead, the fluid deflection member geometry acts on the periphery of the discharge column to direct the fluid stream in a desired manner Such a deflector geometry is shown, for example, in the flow-shaper members of U.S. Pat. Nos. 8,662,190; 8,151,462 and 7,712,218. In each of the sprinkler assemblies shown, the fluid deflection member is located and affixed downstream of the sprinkler outlet with the sprinkler trigger seated against a yoke member to support the seal assembly in the sprinkler passageway. Each of the seal assembly, trigger and yoke member are located between the outlet and the fluid deflection member. In order to ensure that the central core of fluid discharge is not impacted by the trigger or supporting structures upon thermal actuation of the trigger, the sealing assembly includes a sealing spring that acts against the sealing surface to bias or urge the sealing assembly out of the outlet. Moreover, the yoke member is structured to increase its instability in the assembly upon trigger actuation so that the yoke member falls out of the fluid flow path along with the ejected sealing assembly. In the sprinkler assemblies of U.S. Pat. Nos. 8,662,190; 8,151,462 and 7,712,218, the seal assembly forms a fluid tight seal against an internal sealing surface located at or proximate the outlet. Accordingly, firefighting fluid delivered to such an installed sprinkler assembly, fills the sprinkler up to the seal assembly proximate the outlet. The presence of the fluid proximate the outlet provides fluid pressure to act against the seal assembly, trigger and yoke member to clear them from the fluid flow path upon trigger actuation and maintain the unencumbered fluid flow path.

Another type of automatic sprinkler is the dry sprinkler assembly. An example of a dry sprinkler is shown in U.S. Pat. No. 8,636,075. Dry sprinklers can be configured for installation in a variety of orientations depending upon the application. Dry sprinklers can be configured for an upright installation, a pendent installation or a horizontal installation. An example of a pendent-type dry sprinkler is shown and described in U.S. Pat. No. 5,664,630. An example of a horizontal dry sprinkler is shown and described in U.S. Pat. No. 7,921,928. A dry sprinkler assembly generally includes a tubular sprinkler housing with an inlet end fluid opening and a discharge outlet opening axially spaced from the inlet opening with an internal passageway extending therebetween. An internal fluid control assembly is supported within the housing between the inlet and outlet openings by a frangible thermally responsive glass bulb trigger to seal the sprinkler at the fluid inlet. When the bulb fractures in response to a fire, a component of the fluid control assembly is ejected from the outlet of the housing allowing the remainder of the fluid control assembly to axially translate out of its sealed position thereby opening the fluid inlet and sprinkler internal passageway. To ensure proper opening and operation of a dry sprinkler assembly, it is important that the ejected member completely clear the sprinkler structure and fluid flow path between the housing and the fluid deflection member. The sprinkler shown and described in U.S. Pat. No. 7,921,928 includes a sprinkler body attached to the housing to define the outlet opening. As shown, the sprinkler body includes a pair of frame arms that extend away from the outlet opening and converge toward a coaxially centrally aligned fluid deflection boss, to which the fluid deflection member is affixed. The fluid deflection boss and the fluid deflection member present a central abutment to the fluid discharge from the sprinkler outlet opening to redirect and spread the discharged fluid from its center and provide an effective horizontal fluid distribution. It is believed that, there remains a need for alternate dry sprinkler and fluid deflection member assemblies, and in particular, for dry sprinkler assemblies with fluid deflection members that provide for an unencumbered fluid flow path.

DISCLOSURE OF INVENTION

Preferred embodiments of a dry fire protection sprinkler and fluid deflection member assembly are provided. The preferred sprinkler assembly generally includes an elongate tubular outer housing having a first end and a second end opposite the first end. Within the tubular housing, an internal conduit extends from the first end to the second end along a longitudinal sprinkler axis. The first end of the housing defines a fluid intake end of the sprinkler assembly having an inlet opening and an internal sealing surface proximate the inlet opening. The second end of the housing defines a fluid discharge end of the sprinkler assembly having an outlet opening. A fluid deflection member is affixed to the housing at a preferably fixed distance from the outlet opening to define an unencumbered fluid flow path.

The sprinkler assembly is preferably an automatic sprinkler in which fluid flow through the sprinkler is regulated by a thermally responsive trigger assembly and a preferred internal fluid control assembly disposed within the housing. The trigger defines an unactuated state of the sprinkler assembly in which the trigger supports the internal fluid control assembly within the housing to form a fluid tight seal with the internal sealing surface. Upon thermal operation of the trigger, an actuated state of the sprinkler assembly is defined in which the internal fluid control assembly is displaced and preferably axially translated out of contact with the internal sealing surface. Preferred embodiments of the fluid control assembly include a support subassembly that provide an ejectable member that is ejected out of the housing upon sprinkler actuation. Upon sprinkler actuation, preferred embodiments of the ejectable member of the fluid control assembly define a mechanical interface with other structures of the sprinkler assembly which facilitates ejection of the ejectable member through the housing outlet opening. Moreover, the preferred mechanical interface facilitates clearance of the ejectable member and other sprinkler components out of the preferred unencumbered fluid flow path of the sprinkler assembly.

Preferred embodiments of a dry sprinkler assembly include a tubular outer housing having a first end and a second end opposite the first end with an internal conduit extending from the first end to the second end along a central longitudinal sprinkler axis. The first end of the housing defines a fluid intake end of the sprinkler assembly having an inlet opening and an internal sealing surface proximate the inlet opening. The second end of the housing defines a fluid discharge end of the housing having an outlet opening. The second end of the housing also preferably includes a terminal portion of the housing that circumscribes about the central longitudinal axis. The preferred terminal portion of the housing is axially spaced from the outlet opening to preferably define a frame window between the terminal portion and the outlet opening. A fluid control assembly is disposed coaxially within the internal conduit of the outer housing for displacement from being in in fluid tight contact with the sealing surface to being out of contact with the sealing surface to provide for an unencumbered fluid flow path extending along the central longitudinal sprinkler axis from the fluid control assembly through the terminal portion. A preferred fluid deflection member is affixed to the terminal portion of the housing. The fluid deflection member preferably includes has a fluid flow surface to maintain the unencumbered fluid flow path along the central longitudinal sprinkler axis between the fluid control assembly to the fluid flow surface when the fluid control assembly is out of contact with the sealing surface. Preferred embodiments of the fluid deflection member include at least one tab radially spaced from the central longitudinal axis at a fixed distance from the outlet opening to define the preferred fluid flow surface and maintain the unencumbered fluid flow path along the central longitudinal sprinkler axis extending between the fluid control assembly and the at least one tab.

In another preferred embodiment of the sprinkler assembly, the tubular outer housing includes a pair of frame arms diametrically opposed about the outlet opening extending axially therefrom to define a frame window therebetween. A preferred fluid deflection member is coupled to the frame arms at the preferred fixed distance from the outlet opening. Preferred embodiments of the sprinkler assembly and its fluid deflection member define an unencumbered fluid flow path for a column of fluid discharge from the outlet opening of the housing. In one preferred embodiment, the fluid deflection member includes at least one tab, and more preferably includes at least two tabs opposed from one another about a plane that includes the central longitudinal sprinkler axis. The preferred tabs act on an unencumbered column of fluid discharge from the outlet opening in a radially inward direction. In preferred embodiments, each of the tabs are symmetrical about a second plane that is perpendicular to and intersects the first plane along the central longitudinal sprinkler axis with the pair of frame arms being aligned with one another in the second plane. The pair of frame arms preferably terminate at an annular boss centered about the central longitudinal sprinkler axis with the preferred fluid deflection member being affixed to the annular frame boss.

Preferred embodiments of the sprinkler assembly include a trigger embodied as a frangible glass bulb having a first end seated against the support subassembly and an opposite second end seated against a yoke member to align the glass bulb along the central sprinkler axis. The yoke preferably includes a crossbar portion with a central region for seating the second end of the glass bulb and two end regions disposed about the central region that are each subject to a load force to axially load the glass bulb and fluid control assembly. The preferred yoke member includes an extension member extending between the two end regions of the yoke member to define a center of gravity that is off-set from the central longitudinal sprinkler axis.

BRIEF DESCRIPTION OF DRAWINGS

The accompanying drawings, which are incorporated herein and constitute part of this specification, illustrate exemplary embodiments of the invention, and together, with the general description given above and the detailed description given below, serve to explain the features of the invention. It should be understood that the preferred embodiments are some examples of the invention as provided by the appended claims.

MODE(S) FOR CARRYING OUT THE INVENTION

Figure 1:
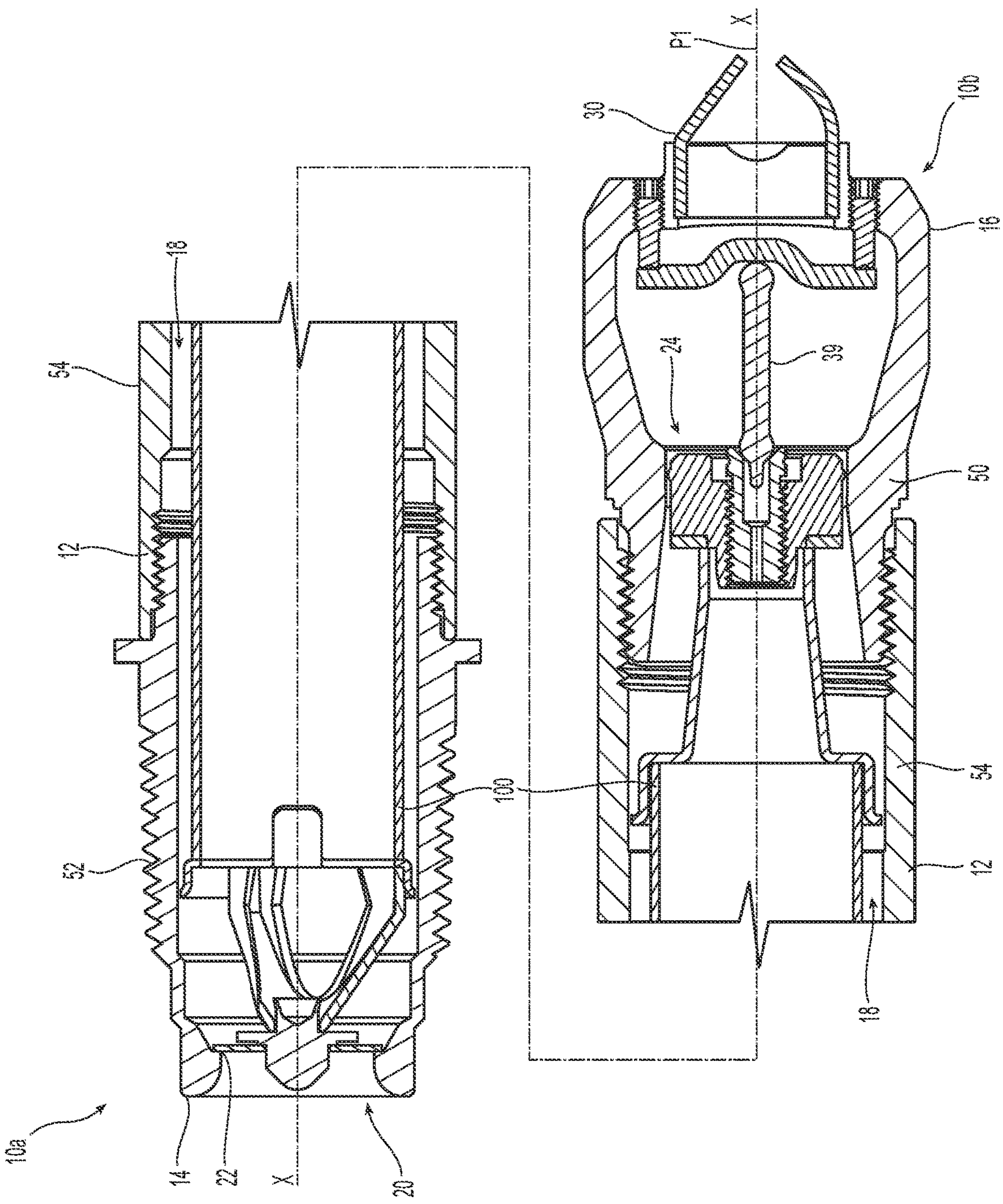
FIGS. 1, 1A and 1B are various cross-sectional views of a preferred embodiment of a dry sprinkler assembly.
Figure 1A:
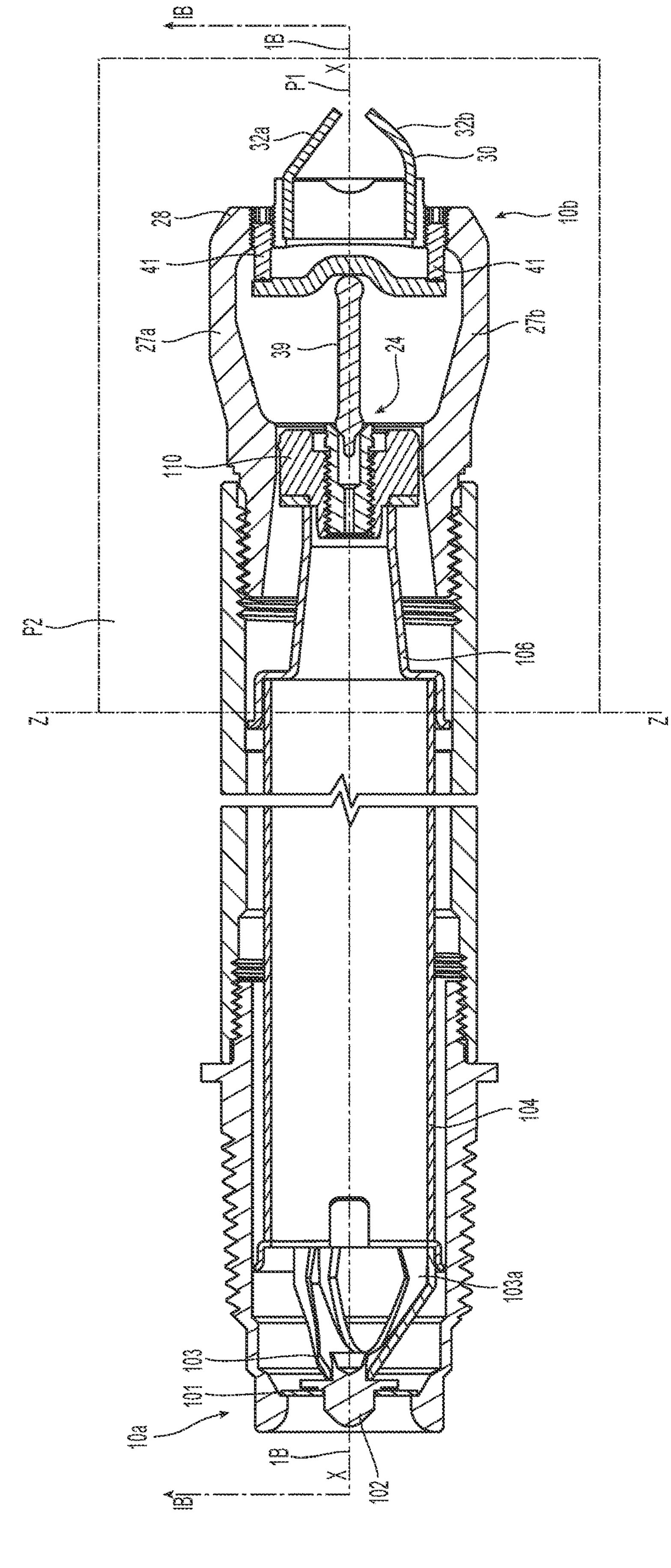
Figure 1B:
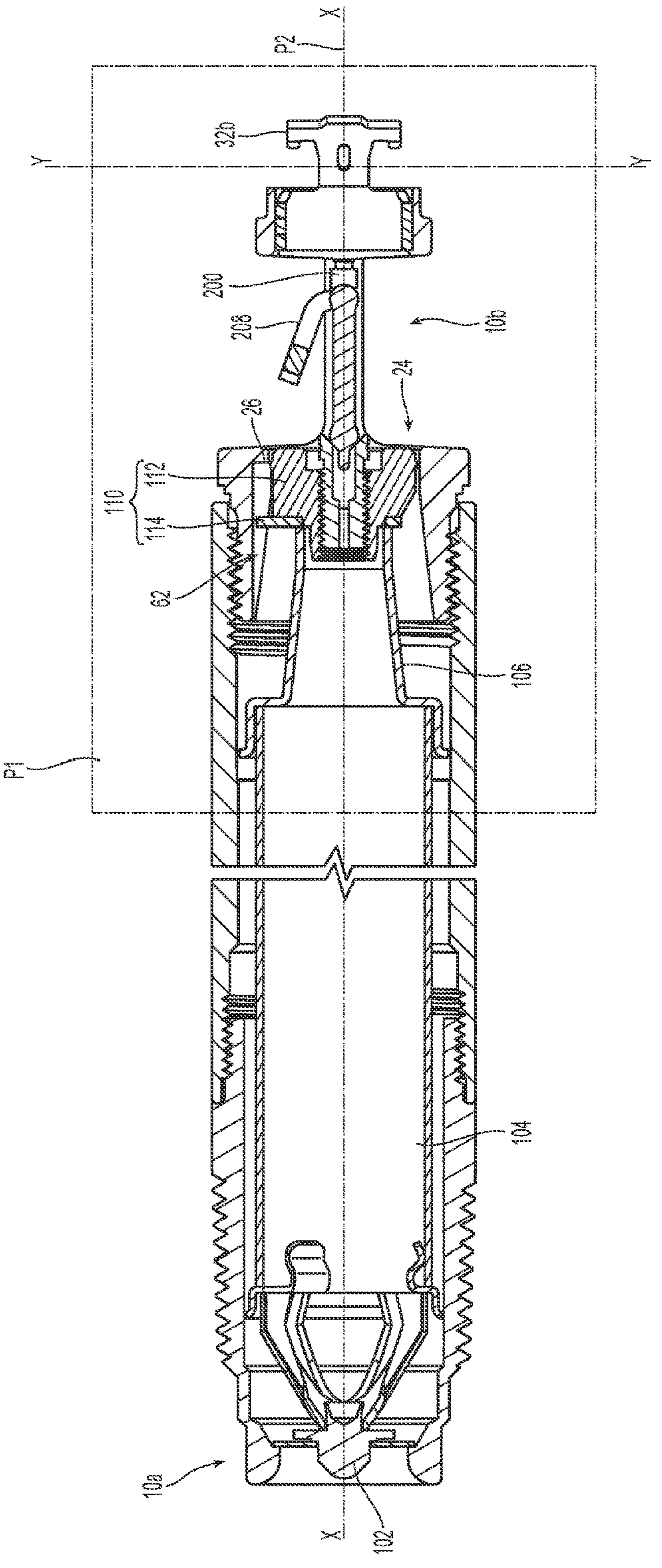

Shown in FIGS. 1, 1A and 1B is a preferred embodiment of a dry sprinkler assembly 10. Preferred embodiments of the sprinkler can be configured for an upright installation, a pendent installation or a horizontal installation. The sprinkler assembly generally includes an elongate tubular outer housing 12 having a first end 14 and a second end 16 opposite the first end 14. Within the tubular housing 12, an internal conduit 18 extends from the first end 14 to the second end 16 along a central longitudinal sprinkler axis X-X. The first end 14 of the housing 12 defines a fluid intake end 10*a* of the sprinkler assembly 10 having an inlet opening 20 and an internal sealing surface 22 proximate the inlet opening 20. The second end 16 of the housing 12 defines a fluid discharge end 10*b* of the sprinkler assembly 10 having an outlet opening 24. Installed, the first end 14 of the sprinkler assembly 10 can be coupled to a fluid supply pipe of a sprinkler system with the central longitudinal sprinkler axis X-X in, for example, a preferably horizontal orientation parallel to the floor or ceiling for fluid discharge from the outlet opening 24 directed horizontally in the direction of the sprinkler axis X-X toward a fluid deflection member 30 affixed to the housing 12. Preferred embodiments of the fluid deflection member 30 can direct the flow of fluid outwardly and downwardly, with some of the fluid lifted to project the fluid across a room, for example, and some of the fluid directed laterally downward to provide wall wetting.

Generally, fluid flow through the sprinkler assembly 10 is controlled by a fluid control assembly 100 disposed within the internal conduit of the outer housing 12 for displacement from a first position in fluid tight contact with the sealing surface 22 to a second position out of contact with the sealing surface 22 to permit the flow of firefighting fluid therethrough. The sprinkler 10 is a preferably an automatic sprinkler in which fluid flow through the sprinkler is regulated by a thermally responsive trigger assembly 39 and the preferred internal fluid control assembly 100 disposed within the housing 12. The trigger 39 defines an unactuated state of the sprinkler assembly 10 in which the trigger 39 supports the internal fluid control assembly 100 within the housing 12 into contact with the internal sealing surface 22 to form a fluid tight seal with the internal sealing surface 22 and seal the rest of the sprinkler assembly from the supply pipe. Upon thermal operation of the trigger 39 in response to a level of heat indicative of a fire, an actuated state of the sprinkler assembly 10 is defined in which support of the fluid control assembly 100 has been removed which permits the internal fluid control assembly 100 to displace, and more preferably axially translate, out of contact with the internal sealing surface 22 under the fluid pressure in the fluid supply pipe of the system and/or an internal spring (not shown) that biases the fluid control assembly out of contact with the internal sealing surface 22. Firefighting fluid delivered to the intake end 10*a* of the sprinkler assembly flows through the internal conduit 18 and the internal fluid control assembly 100 and is discharged out of the outlet opening 24 of the housing 12 along a fluid flow path for effective fluid distribution fire protection by the fluid deflection member 30 affixed to the housing 12 preferably at a fixed distance from the outlet opening 24 which defines a frame window therebetween.

The fluid control assembly 100 includes an ejectable member that is translated out of the internal conduit 18 of the housing, ejected out the outlet opening 24 and displaced out of the fluid flow path between the outlet opening 24 and the fluid deflection member 30. In the preferred sprinkler assembly 10, a preferred structural and dynamic relationship between the ejectable member and the housing ensure proper guided and complete ejection and displacement of the ejectable member out of the fluid discharge fluid flow path. Generally, the ejectable member preferably defines a mechanical interface with other structures of the sprinkler assembly such as, for example, the housing which facilitates ejection of the ejectable member through the housing outlet opening and out of the preferred unencumbered fluid flow path upon thermal actuation of the sprinkler. More specifically, with the fluid control assembly 100 out of contact with the internal sealing surface 22, preferred embodiments of the mechanical interface include a surface contact between the ejectable member of the fluid control assembly 100 and an internal or external surface of the housing 12 to guide the ejectable member out of the housing 12 and pivot the member out of the frame window and clear of fluid flow path. Alternatively, the sprinkler assembly 10 can include an intermediate member between the ejectable member and the housing such as, for example, a biasing member or spring to pivot the member out of the frame window and clear of fluid flow path. The member is ejected into the frame window with the member initially coaxially aligned with the central sprinkler axis and then skewed with respect to the central longitudinal sprinkler axis upon the member contacting the housing surface and more preferably an internal contact surface of the housing. Moreover, the preferred structural and dynamic relationship between the ejectable member and the housing 12 define a spatial and temporal coordination between the axial translation of the ejectable member and its pivot out of the fluid flow path by axially guiding the ejectable member and inhibiting or otherwise preventing its angular rotation about the central longitudinal axis X-X.

In preferred embodiments of the sprinkler assembly 10, the fluid deflection member 30 is located at a fixed distance from the outlet opening 24 and in the housing 12, the second end 16 preferably includes a terminal portion 28 axially spaced downstream from the outlet opening 24 to which the fluid deflection member 30 can be affixed. The terminal portion 28 preferably defines the preferred frame window between the terminal portion 28 and the outlet opening 24. The terminal portion 28 preferably, at least partially, circumscribes the central longitudinal sprinkler axis X-X, and more preferably, completely circumscribes the sprinkler axis X-X. Alternatively or additionally, in order to locate the deflector, the sprinkler housing 12 preferably includes a pair of frame arms 27*a*, 27*b* that are diametrically opposed about the outlet opening 24 extending axially away therefrom between the outlet opening 24 and the preferred terminal portion 28 toward the deflection member 30. In an alternative embodiment, the frame arms 27*a*, 27*b* can converge toward the central longitudinal axis X-X and form a coaxially aligned fluid deflection boss, for example as seen in U.S. Pat. No. 8,636,075, to which the fluid deflection member 30 can be affixed. In such an embodiment, the deflection member 30 can include or define a central portion that, together with the deflection boss, presents an abutment to the fluid discharge from the outlet opening 24 to redirect and spread the discharged fluid from its center to fan the fluid radially outwardly to provide, for example, an effective horizontal fluid distribution.

In preferred embodiments of the sprinkler assembly 10, a fluid distribution with an unencumber fluid flow path is provided. More particularly, embodiments of the sprinkler housing 12, fluid control assembly 100 and fluid deflecting member 30 provide for the preferred unencumbered fluid flow path that extends from the outlet opening 24 to the fluid deflection member 30 and more preferably extends from the fluid control assembly 100 to the fluid deflection member 30. For preferred embodiments of the sprinkler assembly 10, the preferred fluid control assembly 100 includes the preferred ejectable member that clears the frame window between the outlet opening and the terminal portion of the housing 12 upon sprinkler actuation to define the preferred unencumbered fluid flow path along the central longitudinal sprinkler axis from at least the outlet opening 24 to the terminal portion 28 and preferably through the terminal portion 28. Preferred embodiments of the fluid deflection member 30 affixed to the housing 12 has one or more fluid flow surfaces that extends the preferred unencumbered fluid flow path from the terminal portion 28 of the housing to the fluid flow surface of the fluid deflection member 30. For a fluid column discharged from the outlet opening 24, the fluid column is acted on at its outer surface or periphery by the fluid deflection member 30 to direct the fluid stream in a desired manner to produce the fluid distribution for effective fire protection. Accordingly, preferred embodiment of the sprinkler assembly 10 provide that the unencumbered fluid flow path extends through the fluid deflection member 30.

In preferred embodiments of the sprinkler housing 12, the terminal portion 28 preferably forms an annular member centered and circumscribed about the central longitudinal sprinkler axis. In preferred embodiments of the housing 12 having the pair of frame arms 27*a*, 27*b*, the arms terminate at the terminal portion 28 and more preferably at the annular formation 28. In the actuated state of the preferred sprinkler assembly 10, the preferred unencumbered fluid flow path extends from the outlet opening 24 to the annular formation 28 and more preferably through the annular formation 28. The fluid deflection member 30 is preferably affixed to the outer housing 12 and more preferably affixed to the terminal portion 28 to locate the fluid deflection member 30 at the preferred fixed distance from the outlet opening 24. Preferred embodiments of the fluid deflection member 30 include one or more fluid flow surfaces radially spaced from the central longitudinal axis for acting on the periphery of the discharge column from the outlet 24. Accordingly, the fluid deflection member 30 preferably extends the preferred unencumbered fluid flow path along the central longitudinal sprinkler axis from the terminal portion 28 to the fluid flow surface.

Preferred embodiments of the fluid deflection member 30 include at least one tab 32 that is radially spaced from the central longitudinal sprinkler axis X-X and which includes the preferred fluid flow surfaces, edges and/or slots to define preferred geometries for acting on the periphery of the discharge column. With specific reference to FIGS. 1A and 1B, preferred embodiments of the fluid deflection member 30 more preferably includes at least two tabs, such as for example, a preferred first tab 32*a* and a preferred second tab 32*b*. The first and second tabs 32*a*, 32*b* are opposed from one another about a first plane P1 defined by the central longitudinal sprinkler axis X-X and a lateral axis Y-Y extending perpendicular to the central longitudinal sprinkler axis X-X to define the preferred unencumbered fluid flow path extending from the outlet opening 24, and more preferably from the fluid control assembly along the central longitudinal sprinkler axis X-X to the tabs 32*a*, 32*b*. The preferred fluid deflection member 30 can be configured similarly to the flow-shaping member as shown and described in any one of U.S. Pat. Nos. 8,662,190; 8,151,462 and 7,712,218. Accordingly, preferred embodiments of the sprinkler assembly can provide for the preferred unencumbered fluid flow path to extend from the outlet opening 24, and more preferably from the fluid control assembly 100, through the fluid deflection member 30 along the central longitudinal sprinkler axis X-X to the tabs 32*a*, 32*b*.

Figure 2:
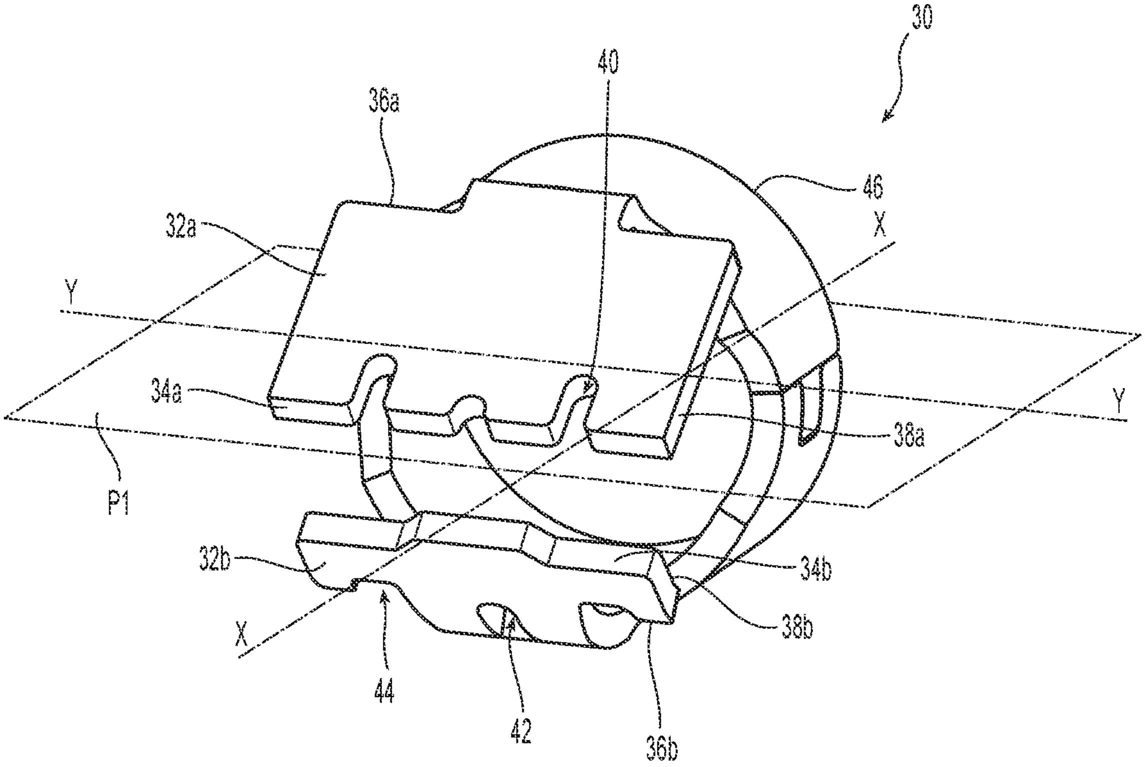
FIG. 2 is a preferred fluid deflection member for use in the sprinkler assembly of FIG. 1.

As seen in FIG. 1A and FIG. 2, each of the tabs 32*a*, 32*b* are preferably angled with respect to the sprinkler axis X-X to present inwardly facing fluid flow surfaces to the outlet 24. With particular reference to FIG. 2, each of the preferred first and second tabs 32*a*, 32*b* have a leading edge 34*a*, 34*b* and a trailing edge 36*a*, 36*b* with the fluid flow surfaces 38*a*, 38*b* extending therebetween. Each of the first and second tabs 32*a*, 32*b* are angled and more preferably skewed with respect to the central longitudinal sprinkler axis X-X so that the leading edge 34*a*, 34*b* is radially inward of the trailing edge 36*a*, 36*b*. The angle of the tabs 32*a*, 32*b* preferably taper the unencumbered fluid flow path. Each of the tabs 32*a*, 32*b* define a preferred included angle with the central longitudinal sprinkler axis X-X that ranges from thirty degrees to sixty degrees)(30°-60°. The included angles of the tabs can be the same or different. In one preferred embodiment, the first tab 32*a* defines a preferred included angle ranging from 35°-40° and is more preferably 37 degrees. The second tab 32*b* defines a different included angle ranging from 30°-50° and more preferably being any one of 33° and 48° with the central longitudinal sprinkler axis X-X.

The tabs 32*a*, 32*b* and their edges each define a preferably polygon-shaped geometry with features that can be similar to one another. For example, each of the preferred tabs 32*a*, 32*b*, can have parallel lateral edges that extend perpendicularly between the leading and trailing edges. The spacing between the lateral edges define the width of the tabs 32*a*, 32*b* with the length of the lateral edges defining the length of the tabs 32*a*, 32*b*. The widths of the tabs 32*a*, 32*b* may similarly or variably range between 0.300 inch 3.000 inches and lengths of the tabs 32*a*, 32*b* can similarly or variably range between 0.200 to 1.300 inches. More preferably, the tabs 32*a*, 32*b* are geometrically configured differently. In the preferred embodiment of the fluid deflection member 30 of FIG. 2, the leading edge 34*a* of the first tab 32*a* preferably defines a width ranging between 0.5 inch to 0.66 inch with a plurality of spaced apart open-end slots 40. Each of the open-end slots 40 initiate from and extend from the leading edge 34*a* in a direction perpendicular to the leading edge 34*a* to terminate at a terminal end of the slot 40. The plurality of open-end slots 40 preferably includes a central slot with two lateral slots disposed equidistantly about the central slot. The lateral slots each have a slot length that is preferably greater than the slot length of the central slot.

In a preferred fluid deflection member 30, the leading edge 34*b* of the second tab 32*b* preferably defines a width smaller than the leading edge 34*a* of the first tab 32*a* with a central linear edge portion and two lateral linear edge portions disposed about the central portion. The leading edge 34*b* of the second tab 32*b* is preferably configured such that the central linear edge portion is closer to the leading edge 34*a* of the first tab 32*a* than the two lateral linear edge portions of the second leading edge 34*b*. The second tab 32*b* also preferably includes a central closed formed slot 42 extending in a direction perpendicular to the leading edge. Moreover, in another preferred aspect, the trailing edge 36*b* of the second tab 32*b* includes a pair of open-ended slots 44 disposed about the central linear edge portion at the leading edge 34*b* and the central slot 42. The open-ended slots 44 initiate from the trailing edge 36*b* toward the leading edge 34*b* of the second tab 32*b*.

The one or more tabs 32 can be integrally formed with or affixed, directly or indirectly, to the housing 12. For example, the tabs 32*a*, 32*b* can be affixed to or integrally formed with the preferred annular boss 28. More preferably, the tabs 32*a*, 32*b* are formed with an extend from an annular base 46 which is preferably affixed internally to the annular boss 28 of the housing 12. Accordingly, the annular base 46 of the fluid deflection member 30 is dimensioned to be centered within the annular boss 28 and moreover is preferably dimensioned to define and maintain the unencumbered fluid flow path of the sprinkler assembly 10. With reference to FIGS. 1A and 1B, the fluid deflection member 30 is oriented with respect to the frame arms 27*a*, 27*b*. In particular, the tabs 32*a*, 32*b* are preferably located so as be perpendicular to the frame arms 27*a*, 27*b*. The frame arms 27*a*, 27*b* are preferably disposed in and aligned with one another along a second plane P2 that is defined by the central longitudinal axis X-X and a vertical axis Z-Z which extends perpendicular to the first plane P1. Accordingly, the fluid deflection member 30 is oriented such that the first and second planes P1, P2 are perpendicular to one another with their intersection aligned along the central longitudinal sprinkler axis X-X. In the preferred geometry of the fluid deflection member 30, the deflection member 30 is symmetrically bisected by the second plane P2. In the preferred installation of the sprinkler assembly 10, the first plane P1 is oriented parallel to the floor or ceiling with the first tab 32*a* above the second tab 32*b* and the frame arms 27 vertically aligned with one another and the second plane P2 disposed perpendicular to the floor or ceiling.

The housing 12 and the fluid control assembly 100 define and maintain the preferred unencumbered fluid flow path of the preferred assembly 10 by keeping operational components clear of the fluid flow path upon sprinkler operation. Referring again to FIGS. 1A and 1B, a preferred embodiment of the fluid control assembly 100 includes a seal subassembly 102 and a fluid flow tube 104 which forms a discharge orifice end 106 opposite the seal subassembly 102. Abutting the discharge orifice end 106 is a support subassembly 110 which forms the preferred ejectable member of the fluid control assembly 100. Generally, the ejectable support subassembly 110 includes a post member 112 with a projection member 114 affixed to the post member 112 that extends radially outward from the post member 112. Within the housing 12 is an internal contact surface or shelf 26 formed proximate the outlet opening 24. Adjacent the contact shelf 26, the internal surface of the housing 12 preferably includes a formed axially extending channel 62 proximate the outlet opening 24 contiguous with the internal shelf 26. The projection member 114 is received within the channel 62 to axially and rotationally guide the support subassembly 110 and the rest of the fluid control assembly 100 toward the internal contact shelf 26 upon thermal actuation of the sprinkler assembly. The post member 112 is ejected out of the outlet opening 24 to bring the projection member 114 in contact with the internal shelf 26 so as to impart a rotation on the support subassembly 110 and pivot the support subassembly 110 out of the fluid flow path from the outlet opening 24 to the fluid deflection member 30.

Figure 3A:
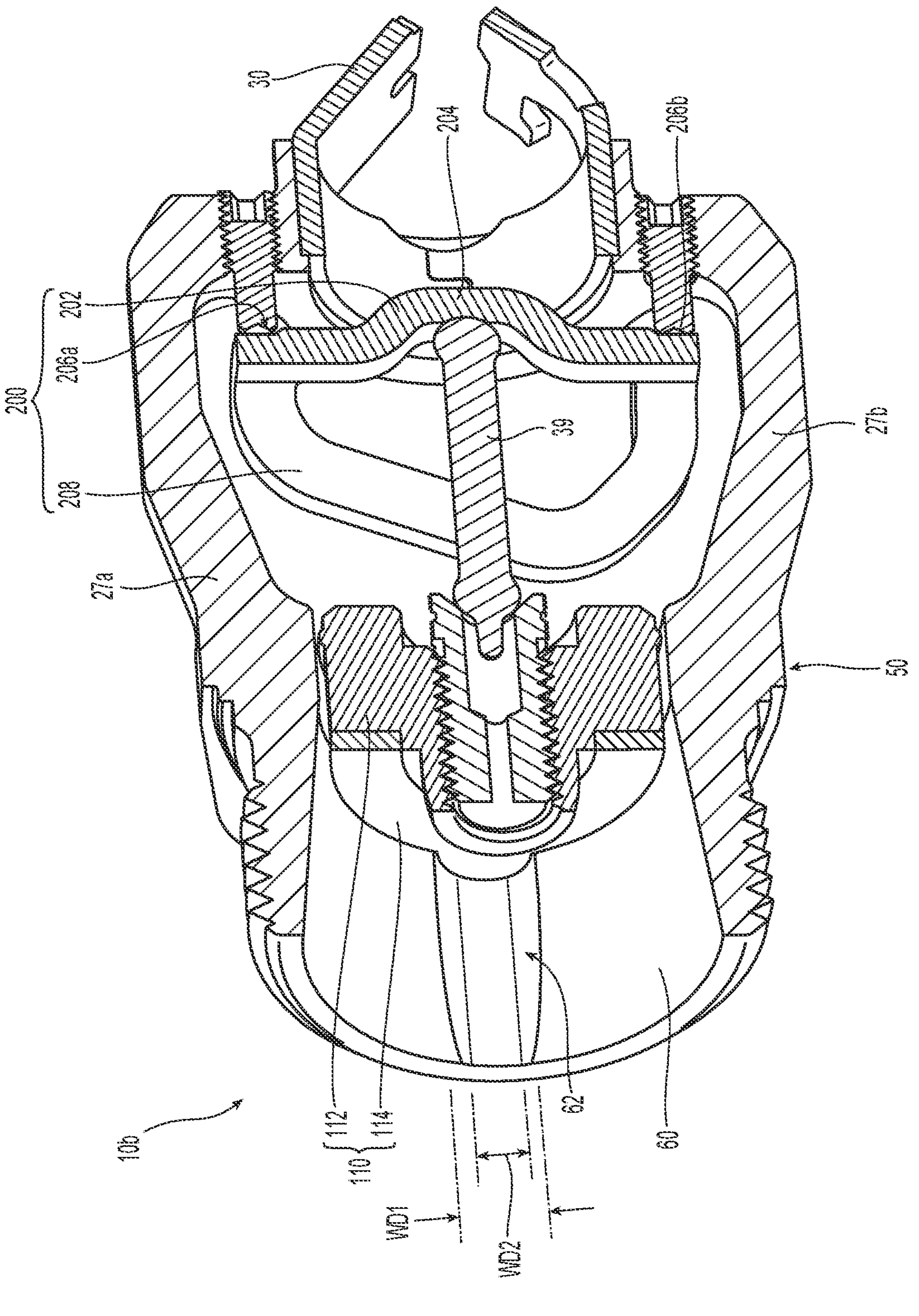
FIGS. 3A-3B are various detailed partial cross-sectional views at the fluid discharge end of the sprinkler assembly of FIG. 1.
Figure 3B:
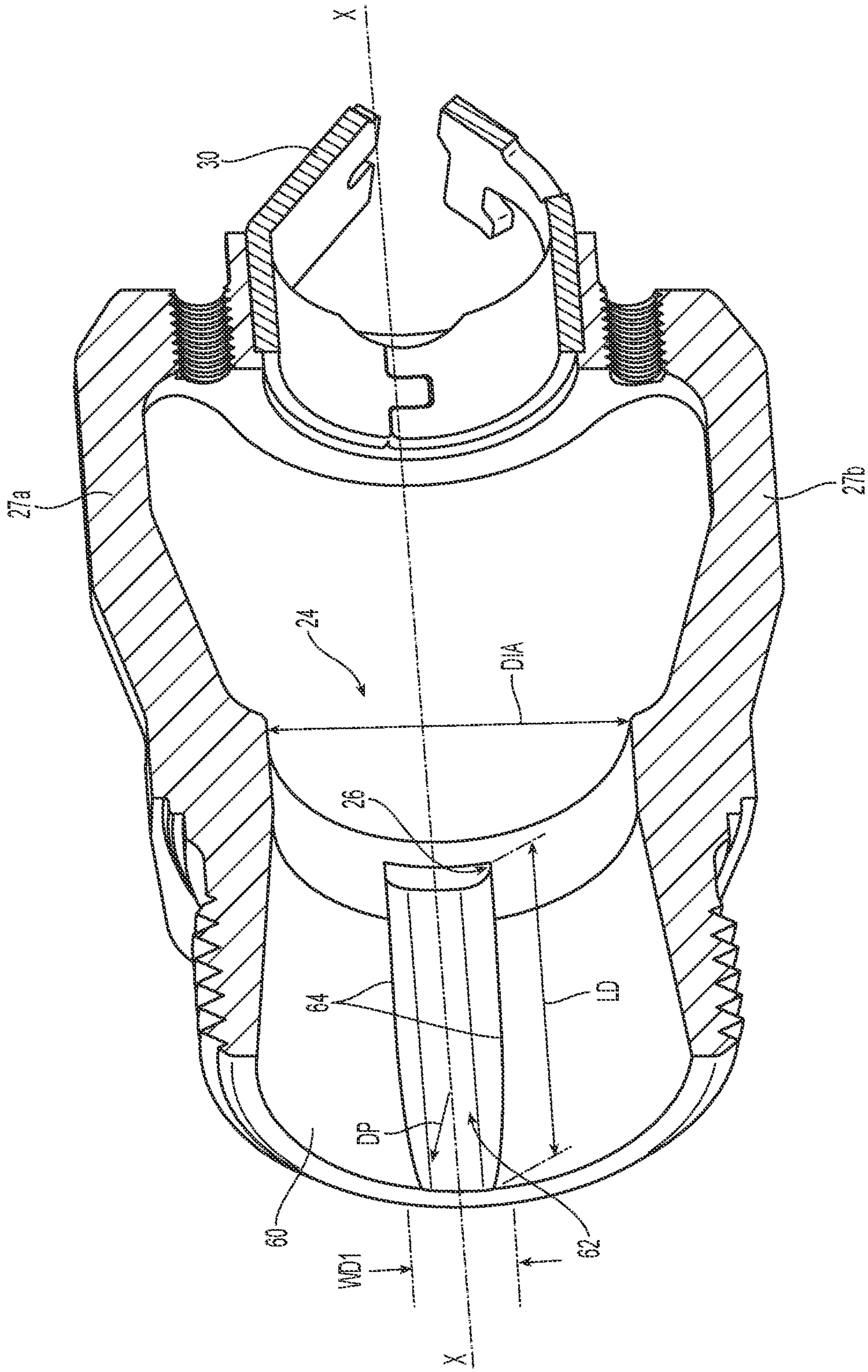

Shown in FIGS. 3A and 3B are detailed partial cross-sectional views of the fluid discharge end 10*b* of the sprinkler assembly 10 of FIGS. 1, 1A and 1B showing a preferred structural and dynamic relationship defined by a preferred mechanical interface between the support subassembly 110 and the internal surface of the housing 12. Although the tubular housing 12 can be formed as a single unitary structure, the tubular housing is more preferably formed by the interconnection of two or more tubular housing components. For example, the housing 12 preferably includes an externally threaded body 50 forming the fluid discharge end 10*b*, another externally threaded tubular component 52 forming the fluid intake end 10*a*, with an intermediate internally threaded tubular component 54 interconnecting the fluid inlet and discharge end components 50, 52. The components of the housing 12 can be joined by alternate means or configurations provided the assembly provides for the internal conduit 18 and fluid intake and discharge ends 10*a*, 10*b* as described herein. The fluid discharge end 10*b* of the housing 12 preferably includes the preferred externally threaded body 50, as shown in FIGS. 3A and 3B, with an internal surface 60 in which the preferred axially extending channel 62 is formed with the preferred internal contact shelf 26 between the channel 62 and the outlet opening 24. The channel 62 is dimensioned and configured to accommodate the projection member 114 of the support subassembly 110 and guide its axial translation toward the internal contact shelf 26 and otherwise constrain angular rotation of the support subassembly 110 about the sprinkler axis X-X. In an alternate embodiment of the sprinkler 10, the internal surface 60 can include the affixed projection member and the support assembly 110 can include the channel formation with an appropriately located contact shelf or surface. In an inverse cooperative relationship, the projection member and channel would axially guide the support subassembly 110 and its shelf formation toward the projection member and resist angular rotation of the support subassembly 110 about the sprinkler axis X-X for its ejection and pivot out of the fluid flow path in a manner as previously described.

In the preferred embodiments shown, the recessed channel region 62 is defined by a depth DP measured in the radial direction preferably from the central axis X-X, a width WD1 measured perpendicular to the radial direction between a pair of channel sidewalls 64 and its axial length LD which is preferably 3.5 to 4 times greater than the width WD1. The width WD1 is sufficiently broad to permit axial translation of the projection member 114 within the channel 62 to contact the internal contact surface 26 and sufficiently narrow to limit or otherwise inhibit and more preferably prevent rotation of the support subassembly 110 about the sprinkler axis X-X and the relative rotation between the support subassembly 110 and the outer housing 12. The channel 62 is preferably located so as to be centered between the frame arms 27*a*, 27*b* to locate the pivot for the support subassembly 110 that is centered between the frame arms 27*a*, 27*b*. The width WD1 of the channel 62 is greater than a width WD2 of the projection member 114 and preferably 10-30% greater than the width of the projection member 114 and more preferably 10-15% greater than the width WD2 of the projection member 114. In a preferred embodiment in which the channel width WD1 is preferably no more than 1.25 times the width WD2 of the projection member 114 and more preferably 1.2 to 1.15 times the width WD2 of the projection member 114. The depth DP of the channel 62 preferably increases in the axial direction toward the internal shelf 26. In another preferred aspect, the preferred channel 62 defines one or more dimensional relationships with other features of the externally threaded body 50, for example, the channel width and length define preferred respective ratios with the diameter DIA of the outlet opening 24. For example, a preferred outlet diameter-to-channel width ratio (DIA:WD1) preferably ranges from 3.5:1 to 4:1 and is preferably 3.75:1. A preferred channel length-to-outlet diameter ratio (LD:DIA) preferably ranges from 1:1 to 1.1:1. In a preferred embodiment, the outlet diameter DIA is 0.75 inch.

Figure 4:
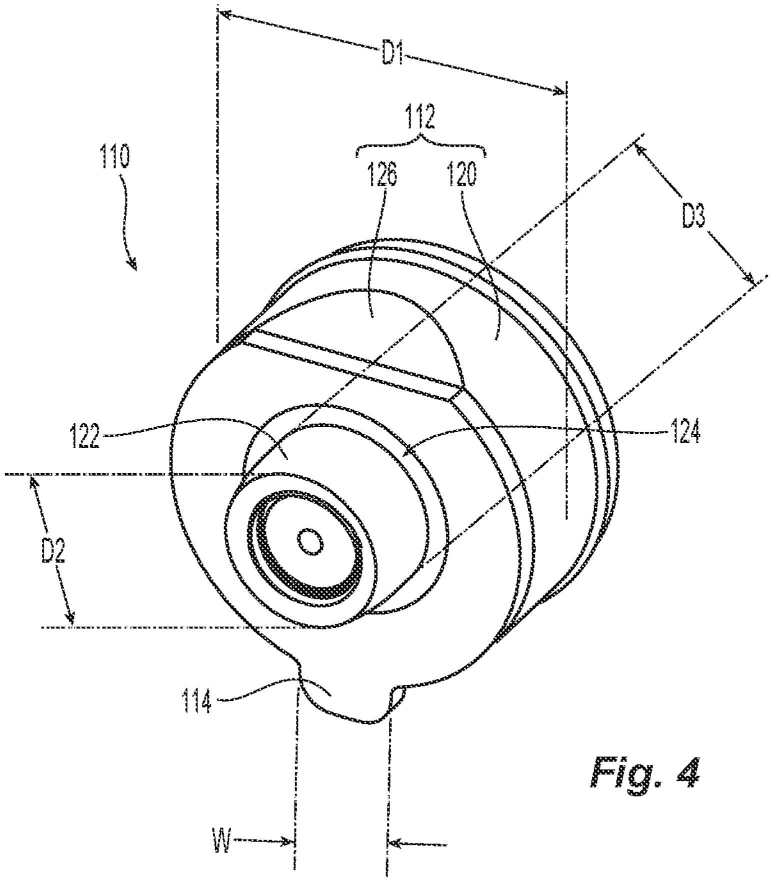
FIG. 4 is a perspective view of a support subassembly used in the sprinkler assembly of FIG. 1.
Figure 4A:
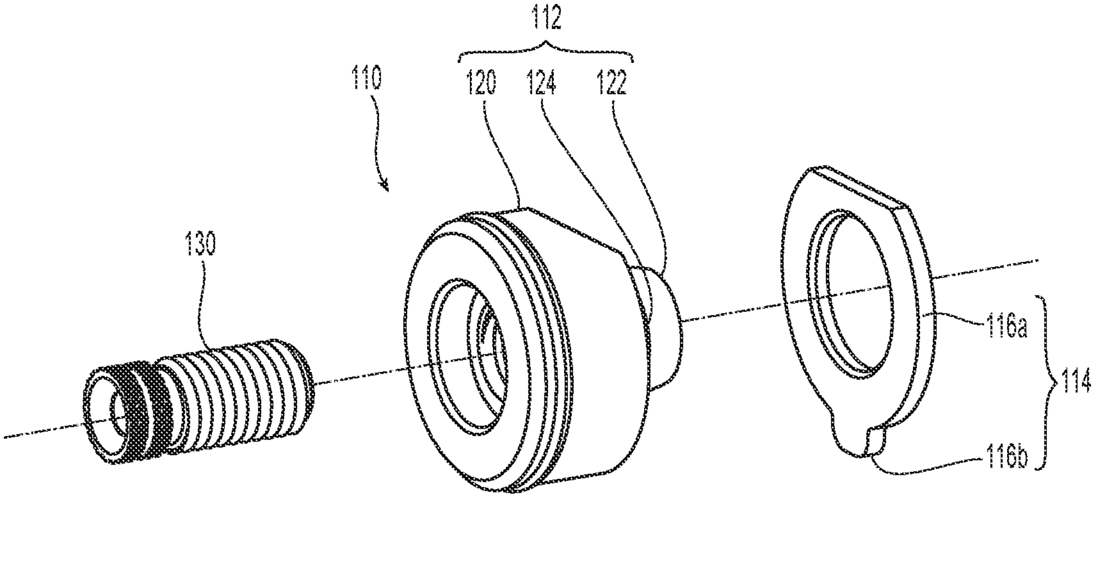
FIG. 4A is an exploded perspective view of the support subassembly of FIG. 4.

Shown in FIGS. 4 and 4A are various views of a preferred support subassembly 110 for use in the flow control assembly 100. The post member 112 preferably includes a cylindrical body portion 120 having a first diameter D1 and a cylindrical head portion 122 of a second diameter D2 smaller than the first diameter with a neck portion 124 formed between the body and head portions 120, 122 having a third diameter D3 greater than the second diameter D2. Alternatively, the diameters post member 112 can be equal to one another or vary from one another in any manner provided the post member 112 provides for the support and ejection of the support assembly 110 in a manner as described herein. The body portion 120 is preferably a right circular cylinder but can define alternate geometries. For example, a preferred embodiment of the body portion can include a chamfered portion 126 as shown in FIG. 4, which can offset the center of gravity of the post member from the sprinkler axis X-X to facilitate the pivoted rotation of the subassembly 110. More preferably, the chamfer is diametrically aligned opposite the projection 114 of the subassembly. The support subassembly 110 remains generally coaxially centered with respect to the sprinkler axis X-X from its position in the unactuated state of the sprinkler assembly 10 through the axial displacement of the support subassembly 110 in the actuated state of the sprinkler assembly 10 until the projection member 114 contacts the internal contact surface 26. In a preferred aspect of the structural and dynamic relationship between the housing 12 and the support subassembly 110, the diameter D1 of the body portion 120 defines a maximum external diameter of the post member 112 and is smaller than the internal diameter DIA of the outlet opening 24 to define an internal diameter-to-maximum external diameter ratio (DIA:D1) that ranges from 1.1:1 to 1:1.

In the support subassembly 110, the projection member 114 preferably extends radially from the post member 112 and more preferably from the neck portion 124. As shown, the projection member 114 is preferably a separate component disposed and secured about the head and neck portions 122, 124 of the post member 112. The preferred projection member 114 includes an arcuate portion 116*a* that at least partially circumscribes and more preferably completely circumscribes the neck portion 124 of the post member 112 and a rectilinear portion 116*b* extending radially from the arcuate portion. The support subassembly 110 preferably includes a pip cap 130 centered within the cylindrical body 120 to support the thermally responsive trigger 39 in the unactuated state of the sprinkler assembly. The support subassembly 110 is seated against the thermally responsive trigger 39 to locate the fluid flow assembly 100 within the housing 12 such that the projection member 114 is within the channel 62 and axially spaced from the internal contact surface 26. In the unactuated state of the assembly, the seal subassembly 102 forms a fluid-tight sealed engagement with the internal sealing surface 22. Together, the post member 112 and the pip cap 130 preferably substantially fill the outlet opening 24 substantially concealing the internal conduit 18 of the housing 12. In the actuated state of the sprinkler assembly 10 upon thermal actuation of the trigger 39 and ejection of the support subassembly 110, the remainder of the fluid control assembly 100 is axially translated in which the seal subassembly 102 is spaced from the sealing surface 22.

In the unactuated state of the sprinkler assembly 10, the thermally responsive trigger 39 is seated preferably at a fixed distance from the outlet opening 24, as shown in FIGS. 1 and 1A, to transfer a compressive load to the fluid control assembly 100 and form the sealed engagement at the internal sealing surface 22. In the preferred embodiment, the trigger 39 comprises a frangible glass bulb having one end preferably seated at or proximate the frame boss 28 under load from one or more screw members 41 threadedly engaged with the frame boss 28. Alternatively, the trigger 39 can be configured as a soldered mechanical assembly seated proximate the frame boss 28. The trigger 39 has a nominal operating temperature and thermal sensitivity to define the thermal responsiveness of the sprinkler at which the sprinkler actuates in response to a fire. In preferred embodiments of the sprinkler assembly 10, the trigger 39 has a preferred nominal operating temperature rating that ranges between 125° F. to 225° F. (52° C.-107° C.) and more preferably is any one of: 155° F. (68° C.); 175° F. (79° C.) or 200° F. (93° C.). The thermal sensitivity of a trigger assembly and sprinkler is measured or characterized by Response Time Index ("RTI"), measured in units of $(ft\cdot s)^{1/2}$ $[(m\cdot s)^{1/2}]$. An RTI of 145-635 $(ft\cdot s)^{1/2}$ [80 $(m\cdot s)^{1/2}$ to 350 $(m\cdot s)^{1/2}$] defines a "Standard Response Sprinkler and an RTI equal to or less than 90 $(ft\cdot s)^{1/2}$ [50 $(m\cdot s)^{1/2}$] defines a "Quick Response Sprinkler." Preferred embodiment of the sprinkler assembly are configured as a quick response sprinkler.

In the preferred embodiment of the sprinkler assembly 10 shown in FIGS. 1, 1A-1B and 3A, the glass bulb trigger 39 is seated against a preferred yoke member 200 to align the glass bulb trigger 39 along the central sprinkler axis X-X and the preferred unencumbered fluid flow path. Generally, the preferred yoke member 200 is configured in a manner similar to the yoke shown and described in U.S. Pat. No. 10,238,903. The preferred yoke member 200 includes a crossbar portion 202 with a central region 204 for seating the end of the glass bulb trigger 39 opposite the support subassembly 110. The crossbar portion 202 also include two end regions 206*a*, 206*b* disposed about the central region 204 that are each subject to a load force to axially load the glass bulb 39 and fluid control assembly 100. In a preferred embodiment, the crossbar portion 202 is preferably formed with the central region 204 located axially further away from the outlet opening 24 than the two end regions 206*a*, 206*b*. The crossbar portion 202 is preferably aligned with the frame arms 27*a*, 27*b* in the vertically extending plane P2. The assembly includes two load screws 41 threadedly engaged with the annular boss 28 to apply a compressive force respectively to the end regions 206*a*, 206*b* of the crossbar portions 202. The yoke member 200 preferably includes an extension member 208 extending between the two end regions 206*a*, 206*b* of the yoke member 200. The extension member 208 preferably extends from the crossbar portion 202 so as to be skewed with respect to the central longitudinal sprinkler axis X-X as shown in FIG. 1B. The extension member 208 can define a center of gravity of the yoke member 200 that is off-set from the central longitudinal sprinkler axis X-X to facilitate rotation and clearance of the yoke member 200 out of the fluid flow path upon sprinkler upon sprinkler actuation.

In a preferred horizontal installation of the sprinkler assembly 10, upon sprinkler thermal actuation in which the trigger 39 ruptures, the preferred support subassembly 110 is ejected horizontally parallel to the floor and the seal subassembly 102 and fluid flow tube 104 translate horizontally toward the outlet opening 24. When the projection member 114 contacts the internal contact surface 26, the support assembly 110 pivots between the frame arms 27*a*, 27*b* about an axis parallel to Z-Z axis and clear of any sprinkler structure to avoid any lodgment of the support subassembly 110. With the support subassembly 110 ejected clear of the sprinkler assembly 10, the inlet opening 20 and the discharge orifice are fully open and the preferred unencumbered fluid flow path are clear for flow of firefighting fluid therethrough to impact the fluid deflection member 30.

The remaining components of the preferred fluid control assembly 100, including the seal assembly 102 and the fluid flow tube 104 can each be configured and assembled using multiple components. For example, as shown in FIG. 1A, the seal assembly 102 preferably includes a spring disc 101 affixed about a base 103 having an array of legs 103*a* extending therefrom. In the unactuated state of the sprinkler assembly, the spring disc 101 forms the fluid tight sealed contact with the internal seal surface 22 of the housing. The seal assembly 102 can be configured as any one of the embodiments of "spring support assembly" shown and described in the dry sprinkler assembly of U.S. Pat. No.

8,636,075. The fluid flow tube can be a single tube or made from multiple tubes. The support subassembly 110 is preferably received within the discharge orifice 106 in an abutting engagement. The seal assembly can be biased in a direction away from the sealing surface 22 by an internal spring member disposed about the first tubular member (not shown). Alternatively, the fluid control assembly 100 can include one or more internal link and plug components shown in U.S. Pat. No. 7,921,928.

In the actuated and open state of the sprinkler assembly 10, the displacement and translation of the preferred fluid control assembly 100 ejects the supporting subassembly 110 and locates the discharge orifice 106 within the body 50 at the fluid discharge end 10*b* of the housing 12 proximate the outlet opening 24. Fluid flowing through the inlet opening 20 flows at a preferred operating pressure, through the fluid flow tube 104, out the discharge orifice 106 and the outlet opening 24 along the preferred unencumbered fluid flow path to define the fluid discharge column that is acted upon by the axially spaced fluid deflection member 30. The discharge orifice is preferably configured and dimensioned to define the desired discharge characteristics of the sprinkler. Accordingly, the discharge orifice 106 can be quantified by a preferred nominal K-factor. The discharge or flow characteristics from the sprinkler body is defined by the internal geometry of the sprinkler including its internal passageway, inlet and outlet (the orifice). As is known in the art, the K-factor of a sprinkler is defined as $K=Q/P^{1/2}$, where Q represents the flow rate (in gallons/min GPM) of water from the outlet of the internal passage through the sprinkler body and P represents the pressure (in pounds per square inch (psi.)) of water or firefighting fluid fed into the inlet end of the internal passageway though the sprinkler body. Generally, the discharge characteristics of the sprinkler body define a preferred nominal K-factor in a range of 4 [GPM/(psi)$^{1/2}$] to 50 [GPM/(psi)$^{1/2}$]. Preferred embodiments of the sprinkler body define a nominal K-factor which preferably ranges from a nominal 4.0 [GPM/(psi)$^{1/2}$] to 14.0 [GPM/(psi)$^{1/2}$]. More preferably, the sprinkler body defines a K-factor of any one of 4.0 [GPM/(psi)$^{1/2}$]; 4.2 [GPM/(psi)$^{1/2}$] or 4.4 [GPM/(psi)$^{1/2}$]. Alternatively, the sprinkler body can define K-factors smaller or larger than the preferred range depending upon the application.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A dry sprinkler assembly comprising:

a tubular outer housing having a first end and a second end opposite the first end with an internal conduit extending from the first end to the second end along a central longitudinal sprinkler axis, the first end defining a fluid intake end of the sprinkler assembly having an inlet opening and an internal sealing surface proximate the inlet opening, the second end defining a fluid discharge end of the housing having an outlet opening, the second end of the housing including a terminal portion of the housing circumscribed about the central longitudinal sprinkler axis, the terminal portion of the housing being axially spaced downstream from the outlet opening; and a fluid control assembly disposed coaxially within the internal conduit of the outer housing for displacement from being in fluid tight contact with the sealing surface to being out of contact with the sealing surface to provide for an unencumbered fluid flow path extending along the central longitudinal sprinkler axis from the fluid control assembly through the terminal portion; and a fluid deflection member affixed to the terminal portion of the housing, the fluid deflection member having a fluid flow surface to maintain the unencumbered fluid flow path along the central longitudinal sprinkler axis between the fluid control assembly and through the fluid deflection member when the fluid control assembly is out of contact with the sealing surface.

2. The dry sprinkler assembly of claim 1, wherein the fluid deflection member has at least one tab radially spaced from the central longitudinal sprinkler axis at a fixed distance from the outlet opening to define the fluid flow surface and maintain the unencumbered fluid flow path along the central longitudinal sprinkler axis extending between the fluid control assembly and the at least one tab.

3. The dry sprinkler assembly of claim 2, wherein the terminal portion is an annular formation circumscribed about the central longitudinal sprinkler axis.

4. The dry sprinkler assembly of claim 2, wherein the fluid deflection member includes an annular base with the at least one tab extending from the annular base in the direction of the unencumbered fluid flow path, the annular base being affixed to the terminal portion of the housing and centered about the central longitudinal sprinkler axis such that the unencumbered fluid flow path extends along the central longitudinal sprinkler axis between the fluid control assembly and the at least one tab and through the annular base.

5. The dry sprinkler assembly of claim 2, wherein the at least one tab has a trailing edge and a leading edge with the fluid flow surface therebetween, the at least one tab being angled with respect to the central longitudinal sprinkler axis so that the leading edge is radially inward of the trailing edge.

6. The dry sprinkler assembly of claim 5, wherein the at least one tab includes a first tab and a second tab opposed from one another about a plane defined by the central longitudinal sprinkler axis and a lateral axis extending perpendicular to the central longitudinal sprinkler axis.

7. The dry sprinkler assembly of claim 6, wherein the plane extending between the first and second tabs defines a first plane and the second end of the tubular outer housing includes a pair of frame arms diametrically opposed about the outlet opening and disposed in a second plane that is perpendicular to the first plane, the pair of frame arms extending in a direction from the outlet opening toward the terminal portion.

8. The dry sprinkler assembly of claim 7, wherein each of the first and second tabs has a trailing edge and a leading edge with the fluid flow surface therebetween, each of the first and second tabs being angled with respect to the central longitudinal sprinkler axis so that the leading edge is radially inward of the trailing edge.

9. The dry sprinkler assembly of claim 8, wherein the leading edge of the first tab and the leading edge of the second tab are spaced apart so as to taper the unencumbered fluid flow path.

10. The dry sprinkler assembly of claim 8, wherein the leading edge of the first tab defines a plurality of spaced apart open end slots extending from the leading edge in a direction perpendicular to the leading edge.

11. The dry sprinkler assembly of claim 10, wherein the plurality of open end slots includes a central slot defining a slot length and two lateral slots disposed equidistantly about the central slot, the lateral slots each having a slot length greater than the slot length of the central slot.

12. The dry sprinkler assembly of claim 8, wherein the leading edge of the second tab defines a central linear edge portion and two lateral linear edge portions disposed about the central linear edge portion, the central linear edge portion being closer to the first plane than the two lateral linear edge portions.

13. The dry sprinkler assembly of claim 12, wherein the second tab includes a closed formed slot extending in a direction perpendicular to the leading edge.

14. The dry sprinkler assembly of claim 12, wherein the trailing edge of the second tab includes a pair of open-ended slots disposed about the central linear edge portion and extending in a direction toward the leading edge of the second tab.

15. The dry sprinkler assembly of claim 1, wherein the fluid control assembly includes an ejectable member and the tubular outer housing defining a mechanical interface such that when the fluid control assembly is out of contact with the internal sealing surface, the ejectable member is ejected through the housing and out of the unencumbered fluid flow path.

16. The dry sprinkler assembly of claim 15, wherein the fluid discharge end of the housing includes an internal shelf proximate the outlet opening and the fluid control assembly includes:

a seal subassembly; and a fluid flow tube abutting the seal subassembly;

wherein the ejectable member comprises a support subassembly abutting the fluid flow tube, the support subassembly including a post member defining an axial length of the support subassembly with a projection member extending radially from the post member, wherein, in an unactuated state of the sprinkler assembly, the post member and projection member of the support subassembly are located within the fluid discharge end of the housing with the projection member axially spaced from the internal shelf; and wherein, in an actuated state of the sprinkler assembly, the support subassembly defines the ejectable member ejected through the outlet opening such that the projection member contacts the internal shelf so as to form the mechanical interface and rotate the support subassembly out of the unencumbered fluid flow path.

17. The dry sprinkler assembly of claim 16, wherein the support subassembly engages a thermally responsive trigger in the unactuated state of the sprinkler assembly.

18. The dry sprinkler assembly of claim 17, wherein the thermally responsive trigger is a glass bulb disposed along the central longitudinal sprinkler axis, the glass bulb having a first end engaging the support subassembly and a second end engaging a yoke member that includes a crossbar portion with a central region for seating the second end of the glass bulb and two end regions disposed about the central region that are each subject to a load force to axially load the glass bulb and fluid control assembly, the yoke member including an extension member extending between the two end regions of the crossbar portion to define a center of gravity that is off-set from the central longitudinal sprinkler axis.

19. A dry sprinkler assembly comprising:

a tubular outer housing having a first end and a second end opposite the first end with an internal conduit extending from the first end to the second end, the first end defining a fluid intake end of the housing having an inlet opening and an internal sealing surface proximate the inlet opening, the second end defining a fluid discharge end of the housing having an outlet opening and a terminal portion spaced from the outlet opening and circumscribed about a sprinkler axis;

a fluid control assembly disposed within the internal conduit of the tubular outer housing, a thermally responsive trigger located proximate the outlet opening, the thermally responsive trigger supporting the fluid control assembly to define an unactuated state of the dry sprinkler assembly with the fluid control assembly in fluid tight contact with the internal sealing surface, the thermally responsive trigger having a thermal operation defining an actuated state of the dry sprinkler assembly to provide a displacement of the fluid control assembly and an unencumbered fluid flow path along the sprinkler axis from the fluid control assembly and through the terminal portion, and a fluid deflection member affixed to the terminal portion, wherein the fluid deflection member comprises a fluid flow surface to provide the unencumbered fluid flow path through the fluid deflection member during the actuated state of the sprinkler assembly.

20. The dry sprinkler assembly of claim 19, wherein the fluid deflection member has at least one tab radially spaced from the sprinkler axis at a fixed distance from the outlet opening to define the fluid flow surface and maintain the unencumbered fluid flow path along the sprinkler axis.

21. The dry sprinkler assembly of claim 20, wherein the at least one tab includes a first tab and a second tab opposed from one another about a plane defined by the sprinkler axis and a lateral axis extending perpendicular to the sprinkler axis, and wherein each of the first and second tabs has a trailing edge and a leading edge with the fluid flow surface therebetween, each of the first and second tabs being angled with respect to the sprinkler axis so that the leading edge is radially inward of the trailing edge.

22. The dry sprinkler assembly of claim 21, wherein the leading edge of the first tab and the leading edge of the second tab are spaced apart so as to taper the unencumbered fluid flow path.

23. The dry sprinkler assembly of claim 19, wherein the sprinkler axis comprises a central longitudinal sprinkler axis extending through the inlet opening and the outlet opening.

24. The dry sprinkler assembly of claim 19, wherein the terminal portion comprises an annular formation completely circumscribed about the sprinkler axis.

25. A dry sprinkler assembly comprising:

a tubular housing having an internal conduit defined between a first end and a second end;

a fluid inlet end component connected in fluid communication with the first end of the tubular housing, the fluid inlet end component having an inlet opening, an internal sealing surface proximate the inlet opening, and a seal assembly in fluid tight contact with the internal sealing surface;

a fluid discharge end component connected in fluid communication with the second end of the tubular housing, the fluid discharge end component having an outlet opening and a terminal portion spaced from the outlet opening and circumscribed about a sprinkler axis;

a thermally responsive trigger proximate the outlet opening, the thermally responsive trigger defining an unactuated state of the dry sprinkler assembly, the thermally responsive trigger having a thermal operation defining an actuated state of the dry sprinkler assembly to displace the seal assembly from the internal sealing surface; and a fluid deflection member affixed to the terminal portion, the fluid deflection member having at least one tab with a fluid flow surface radially spaced from the sprinkler axis at a fixed distance from the outlet opening to provide an unencumbered fluid flow path through the fluid deflection member during the actuated state of the sprinkler assembly.

26. The dry sprinkler assembly of claim 25, wherein the at least one tab includes a first tab and a second tab opposed from one another and disposed about the sprinkler axis, and wherein each of the first and second tabs has a trailing edge and a leading edge with the fluid flow surface therebetween, each of the first and second tabs being angled with respect to the sprinkler axis so that the leading edge is radially inward of the trailing edge.

27. The dry sprinkler assembly of claim 25, wherein the sprinkler axis comprises a central longitudinal sprinkler axis extending through the inlet opening and the outlet opening.

28. The dry sprinkler assembly of claim 25, wherein the terminal portion comprises an annular formation completely circumscribed about the sprinkler axis.

* * * * *